(12) United States Patent
Trahan

(10) Patent No.: US 6,298,313 B1
(45) Date of Patent: Oct. 2, 2001

(54) PASSIVE RANGING USING INFERIOR MIRAGES

(75) Inventor: Joseph W. Trahan, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/156,383

(22) Filed: Sep. 18, 1998

(51) Int. Cl.[7] .................... G01B 11/22; G01B 13/14; G01B 21/18
(52) U.S. Cl. .................................. 702/166; 356/3.01
(58) Field of Search .................. 702/166; 356/3.01–4.1; 250/330, 342, 492.1; 382/84

(56) References Cited

U.S. PATENT DOCUMENTS

| | | | |
|---|---|---|---|
| 4,125,893 | 11/1978 | Hitney et al. ......................... | 364/300 |
| 4,591,987 * | 5/1986 | Brown .................................. | 701/225 |
| 4,824,245 * | 4/1989 | Gardner et al. ...................... | 356/141 |
| 5,042,922 * | 8/1991 | Pepper ................................. | 359/72 |
| 5,075,856 | 12/1991 | Kneizys et al. ...................... | 364/300 |
| 5,255,206 | 10/1993 | Pegis ................................... | 364/572 |
| 5,282,013 * | 1/1994 | Gregoris .............................. | 356/4 |
| 5,282,014 | 1/1994 | Ruhl, Jr. et al. ...................... | 356/5 |
| 5,384,719 | 1/1995 | Baker et al. ......................... | 364/578 |

* cited by examiner

Primary Examiner—Marc S. Hoff
Assistant Examiner—Demetrius R. Pretlow
(74) Attorney, Agent, or Firm—James B. Bechtel, Esq.; John P. McMahon, Esq.

(57) ABSTRACT

A method, and a system responsive thereto, is disclosed for determining the height and range of targets, particularly low altitude targets. The method depends upon the occurrence of a sub-refractive atmosphere causing an inferior mirage image which is utilized along with the real image in a ray tracing technique with the cross-over points yielded therefrom being indicative of the height and range of the target being detected.

11 Claims, 9 Drawing Sheets

PASSIVE RANGING USING INFERIOR MIRAGES

STATEMENT OF GOVERNMENT INTEREST

The invention described herein may be manufactured and used by or for the Government for governmental purposes without the payment of any royalty thereon.

BACKGROUND OF THE INVENTION 1.0 Field of the Invention

The invention relates to detection systems which indicate the presence of an object or target along a path and, more particularly, to a technique preferably utilized in the detection system's passive ranging mode that depends upon the target being enveloped by a sub-refractive atmosphere that provides for the presence of a real image and an inferior mirage image of the targets that are analyzed by ray tracing techniques employed by and of particular importance to the invention to detect for cross-over rays indicative of the height and range of the target being analyzed.

2.0 Description of the Prior Art

Detection systems used in communication and/or countermeasure applications, may employ sensors that operate in response to radiation in the visible band or infrared band of the electromagnetic spectrum. Detection systems further include passive ranging techniques that provide for the detection of a target without betraying the location of the detector. The detection systems extract energy contained in incoming signals as a means for identifying, in terms of height and range, the target that created the incoming signals. The accuracy of this determination is being continuously improved and it is still desired that further improvements be made to these detection systems so as to improve their accuracy.

OBJECTS OF THE INVENTION

It is a primary object of the present invention to provide a method, and a system responsive thereto, for detecting the presence of a target and accurately determining its height and range.

It is a further object of the present invention to provide a method, and a system responsive thereto, for detecting a target enveloped in a sub-refractive atmosphere that provide for a real image and inferior mirage image of the target.

It is a still further object of the present invention to provide a method, and a system responsive thereto, that develops ray tracing of the real image and of the inferior mirage image of the target and utilizes the parameters of the ray tracings of these images to determine the height and range of the target.

Furthermore, it is an object of the present invention to provide a method, and a system responsive thereto, that is particularly suited to perform passive ranging for the detection of low altitude targets.

SUMMARY OF THE INVENTION

The present invention is directed to a method, and a system responsive to, for determining the height and range of a target and that is particularly suited to detect low altitude targets. The technique depends upon the presence of a sub-refractive atmosphere enveloping the target and which is a meteorological condition that makes available inferior mirage images of the target. The method of the invention is preferably practiced in the computer and uses a ray tracing program, that is, a program that embodies two rays being launched into a modeled sub-refractive atmosphere having the initial height and elevation angles of the real image and inferior mirage image and traces the paths thereof. The point of intersection of these ray tracings determines the height and range of the target.

The method comprises providing sensors for receiving electromagnetic radiation created by the target and producing therefrom a real image and an inferior mirage image of the target. The method further consists of determining the elevation of the real and inferior mirage images and also determining the angular separation between the real and inferior mirage images. The method further comprises constructing ray tracing to define each of the real and inferior mirage images and then determining the intersection point of the rays thereof with the intersection point defining the height and the range of the target.

BRIEF DESCRIPTION OF THE DRAWINGS

These and other objects, features and advantages of the present invention, as well as the invention itself, become better understood by reference to the following detailed description when considered in conjunction with the accompanying drawings, wherein.

DETAILED DESCRIPTION OF THE PREFERRED EMBODIMENTS

Figure 1:
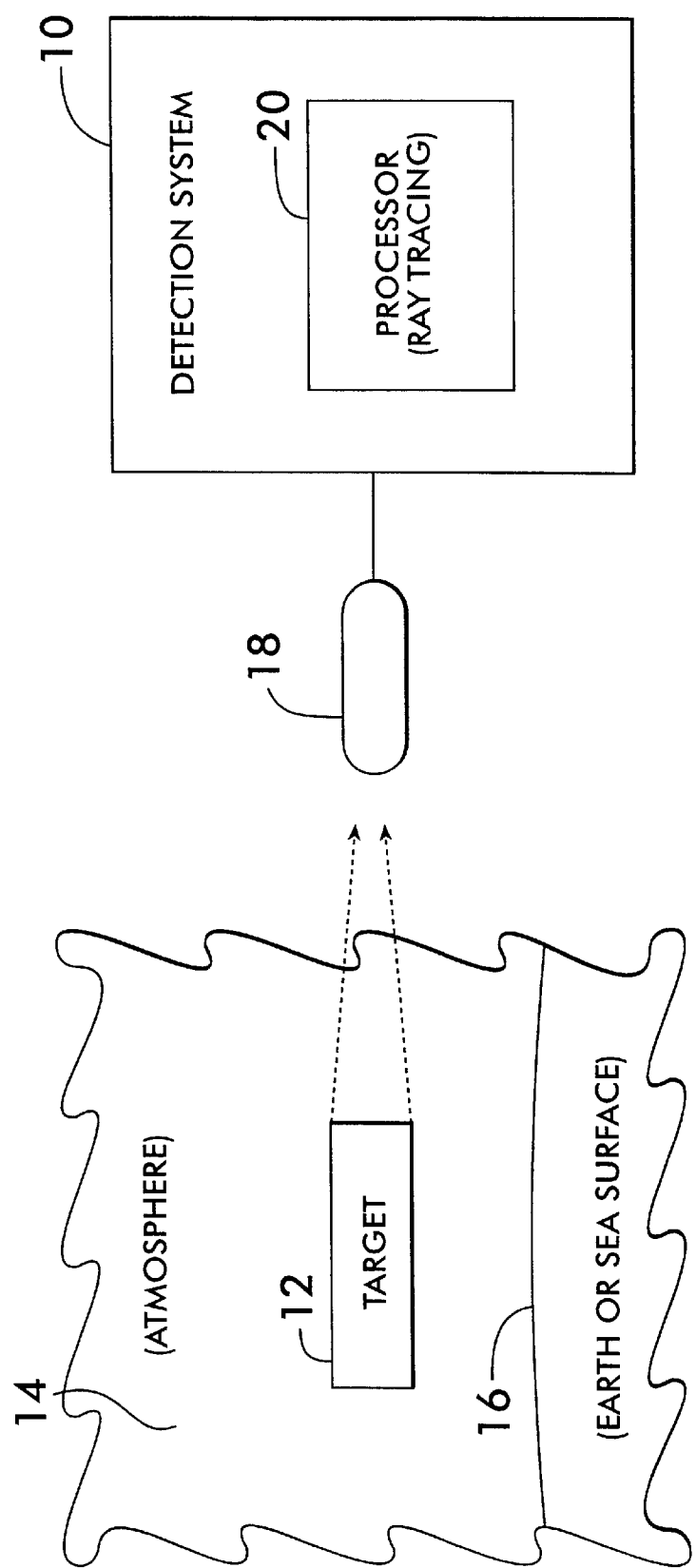
FIG. 1 is a schematic diagram of the essential elements of the present invention.

Referring to the Figs., wherein the same reference number indicates the same element throughout, there is shown in FIG. 1 a schematic generally illustrating the interrelationship of the essential elements of the present invention. More particularly, FIG. 1 illustrates the detection system 10, responsive to the method of the present invention, for determining the height and range of the target 12 acting as a source of electromagnetic radiation and enveloped by a sub-refractive atmosphere 14 defined, in part, by the earth or sea surface 16 and allowing for the presence of both a real image and an inferior mirage image of the target 12. In one embodiment, the system 10 operates in a passive ranging mode for detecting the target 12 without betraying the location of the detector, that is, the detection system 10.

The detection system 10 further comprises at least one sensor for receiving the electromagnetic radiation for further processing by the processor 20, in particular, by a ray tracing program performed by the processor 20. The sensor 18 may be either responsive to the electromagnetic radiation in the visible band or electromagnetic radiation in the infrared band of the electromagnetic spectrum. For either type of electromagnetic radiation emitted by the target 12, the sensor 18 receives the incoming signals representative of the target 12 and transform the incoming signals so as to produce both a real image of the target 12 and an inferior mirage image of the target 12. In one embodiment, the sensor 18 may be an infrared camera having a resolution of about 32.8×32.8 $\mu$ radians and including means for being responsive to an internal detection routine having a data gathering rate of about 4 Hz.

In general, the processor 20 may be of a conventional type and serve as a means for determining the elevation and angular separation between the real and inferior mirage images, means for constructing ray tracing and means for determining the intersection point of the rays defining the real and inferior mirage images.

The processor 20 is responsive to appropriate operating routines so as to construct ray tracing diagrams which are of particular importance to the present invention and that depict the overall nature of both the real image and the inferior mirage image of the target 12 and use the parameters thereof to calculate the height and range of a target. The processor 20, including the ray tracing routine of the present invention, may be part of a detection scheme for a horizon search sensor known in the art. The ray tracing techniques are found in the computer graphics art and provide for a series of rays representative of a specific light source, in this case the target 12 acts as a light source, and determines the parameters of these rays for the estimating of the height and range of the target 12.

In general, the detection system 10 provides for high resolution by utilizing visible band or infrared sensors to perform passive ranging detection techniques particularly suited for low altitude targets. The method of operation of the system 10 depends upon the occurrence of the sub-refractive atmosphere 14 which is a meteorological condition that produce inferior mirages. The present invention may make use of a worldwide weather database "Random 400," known in the art, for performance analysis using electro-optical sensors. The database of the Random 400 consists of about 60% sub-refractive atmospheres. The "Random 400" is described by Austin, Hepfer and Rudzinski, in the publication entitled, "Use of the NSWCDD Weather Databases for Prediction of Atmospheric Transmission in Common Thermal Imaging Sensor Bands," made available by Naval Surface Warfare Center, Dahlgren Division, as their document NSWCDD/TR-94/89, published October 1995, and herein incorporated by reference.

The detection system 10 is dependent upon the atmospheric conditions that envelope the target 12. Changes in atmospheric density cause bending, or refraction, of transmitted electromagnetic radiation. The meteorological factors affecting density in the atmospheric boundary layer (the lower 40 m or so of the atmosphere) are, in order of importance, air temperature, relative humidity, and pressure. The Air-Sea Temperature Difference (ASTD, i.e., the air temperature minus the sea temperature) is an important gauge of the vertical temperature profile near the earth's surface 16 represented in FIG. 1 and is taken into account by the practice of the present invention. Atmospheric refraction can be one of three types: super-refractive, neutral, or sub-refractive. In super-refractive conditions, the air temperature increased with height; the ASTD is positive. Refraction bends the rays of light or infrared radiation downward so as to follow the curvature of the earth. The range to the horizon is increased, as is the maximum detectable range to low flying targets. Convection is diminished, which allows the atmosphere to become stratified. Temperature inversions may form and can produce a type of mirage, commonly referred to as a "superior mirage."

In neutral conditions, the air temperature is nearly constant with height; the ASTD is near zero. For precisely neutral conditions, the air temperature decreases at the adiabatic rate. The air temperature profile does not affect refraction. The water vapor profile, which makes the atmosphere sub-refractive, and the atmospheric pressure profile, which makes the atmosphere super-refractive, mostly cancel each other.

In sub-refractive conditions which are of importance to the present invention, the air temperature decreases as a function of height; the ASTD is negative. Refraction bends the rays away from the earth's surface 16 shortening both the range to the horizon and the maximum detection range to low flying targets. A type of mirage, the inferior mirage, interchangeably referred to herein as "inferior mirage image," is common and indicative of these conditions.

The inferior mirage image, which is of importance to the present invention, is caused by the fact that the temperature gradient is not linear in a sub-refractive atmosphere and it is steepest nearest the sea surface. The rays that pass closer to the sea surface bend more sharply than higher trajectory rays. It is an inferior mirage image of the sky that is visible on a distant road surface on a sunny day. For example, the air in contact with the road is much warmer than that above and contributes to the production of the mirage image. For such a situation, the sub-refractive atmosphere provide the two optical paths between the observer and the target. The present invention makes use of these two optical paths, especially for passive ranging, wherein a target is detected without betraying the location of the system 10. More particularly, the present invention utilizes both the first optical path carrying the real image of the target 12 and the second optical path carrying the inferior mirage image of the target 12.

The passive ranging technique, as well as other techniques contemplated by the present invention, needs knowledge of the sub-refractive atmosphere 14, especially for low altitude targets. Presently, the best known description of the low atmosphere is derived from meteorological measurements based on Monin-Obukhov similarity theory. This theory is more fully described by Church, S. R., in the article "Atmospheric Effect Module in the ARETE' IR Performance Tool," of the publication ARW-252-008-TR, published June 30, 1993, and herein incorporated by reference. Given sea surface temperature, and air temperature, relative humidity, wind speed, and atmospheric pressure at a given height, the description based on the Monin-Obukhov theory provides the vertical profiles of the air temperature, relative humidity, and pressure. Taken together, these profiles determine the vertical profile of the index of refraction of the atmosphere.

The practice of this invention may use the computer code developed by the Defense Research Establishment, Valcartier, Quebec (DREV) to calculate the atmospheric index of refraction. The effect of sea surface waves upon the refractive profile is included in this computer code. This computer code is more fully described by Beaulieu, A. J., "Atmospheric Refraction Model and the Effects of Surface Waves," of the publication Defense Research Establishment, Valcartier, Quebec (DREV) Report 4661/92, published May 1992, and herein incorporated by reference. The parameters of objects or targets enveloped in neutral or sub-refractive atmospheres may be further described with reference to FIG. 2.

Figure 2A:
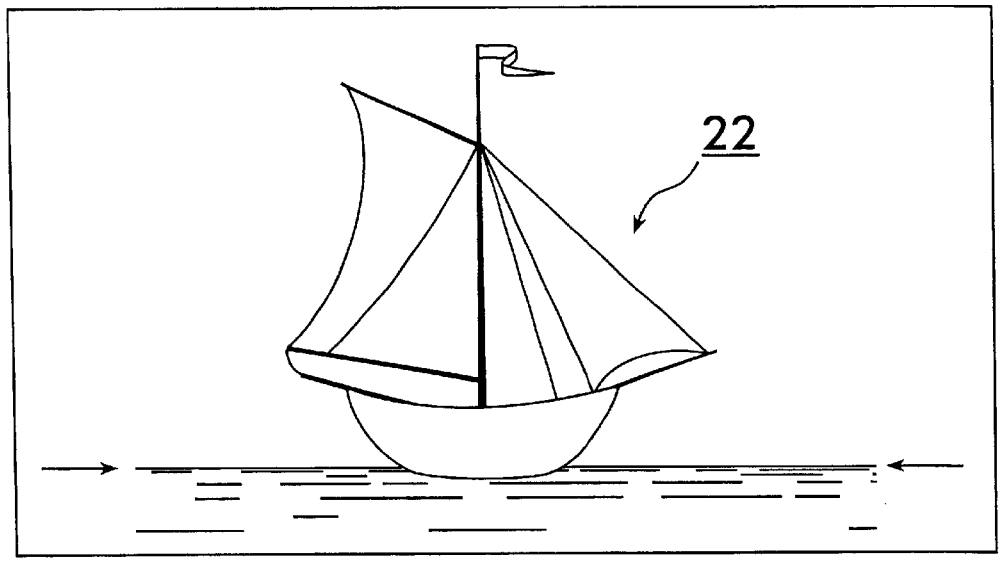
FIG. 2 is composed of FIGS. 2(A) and 2(B) that contrast the differences as respectively seen by an observer of a target located in a neutral and a sub-refractive atmosphere.
Figure 2B:
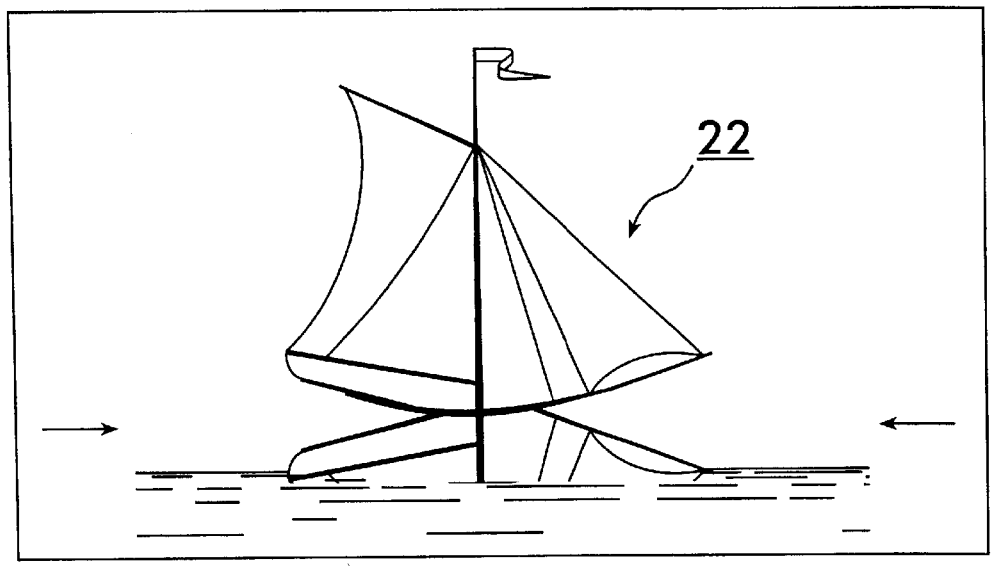

FIG. 2 is composed of FIGS. 2(A) and 2(B) that contrast the differences as seen by an observer, or as recognized by the detection system 10, of a boat 22 respectively depicted in a neutral and in a sub-refractive atmosphere. FIG. 2(B) depicts the appearance of an object, such as the boat 22, as seen in a so-called "mirage zone" to be further described hereinafter with reference to FIG. 3. As seen in FIG. 2(B), the hull of the boat 22 is obscured by a mirage of the deck and lower sails of the boat 22. The contrast between ray tracing of the objects in a neutral (FIG. 2(A)) and a sub-refractive atmosphere (FIG. 2(B)) may be described with reference to FIG. 3 which is composed of FIGS. 3(A) and 3(B) that respectively depict ray traces yielded by objects detected in a neutral and in a sub-refractive atmosphere.

Figure 3A:
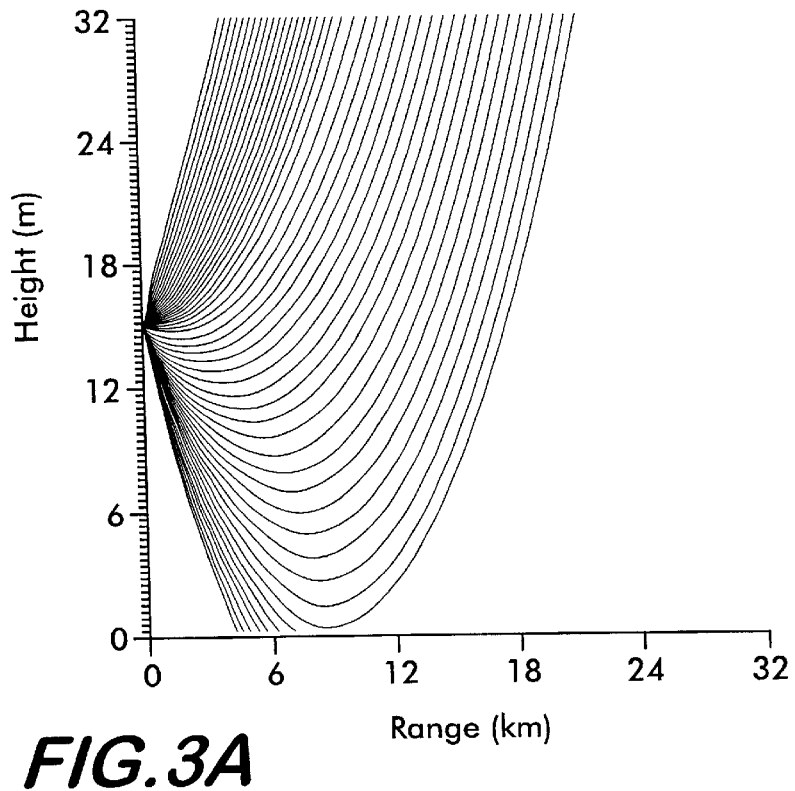
FIG. 3 is composed of FIGS. 3(A) and 3(B) that illustrate the contrast between the ray traces respectively related to an object in a neutral and a sub-refractive atmosphere.
Figure 3B:
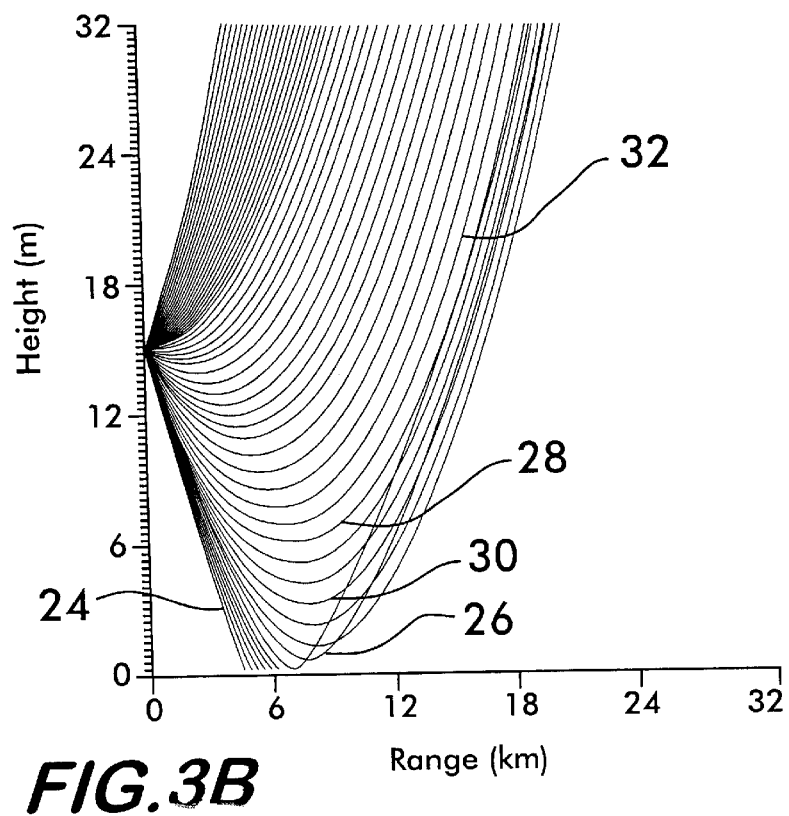

FIG. 3 has an X axis representative of the range of a target 12 in kilometers (km) plotted along the sea surface 16, previously mentioned with reference to FIG. 1, and a Y axis representative of the height of a target 12 given in meters (m). The ray traces generally illustrated in FIG. 3 follow a series of rays (such as light rays generated by a target, such as target 12 of FIG. 1), wherein FIG. 3(A) represents the ray tracing for a target 12 in a neutral atmosphere and FIG. 3(B) represents the ray tracing for a target 12 in a sub-refractive atmosphere 14. The ray tracings of FIG. 3 define the path of the light rays of a target 12 and trace the propagation of the electromagnetic radiation, in the form of light rays, through the neutral atmosphere (FIG. 3(A)) and through the sub-refractive atmosphere 14 (FIG. 3(B)) terminating at the observer, or the detection system 10 of the present invention. The terms "observer" and "detection system 10" are used herein in an interchangeable manner and each possesses the same location or range relative to the target 12, but with the observer being used to describe images as they may be recognized by an individual viewer. Each of the lines or ray traces illustrated in FIG. 3 possesses a different apparent elevation angle relative to the observer or detection system 10.

Each of the rays having a path that stops at the bottom of FIG. 3 represents those that an observer sees as the sea surface 16. The light rays that either continue from the bottom of FIG. 3 to the top of FIG. 3 or bend away from the bottom of FIG. 3 and rise to the top of FIG. 3 are indicative of the sky as seen by an observer. Each of the light rays that just skim the bottom and continue to the top define the apparent elevation of the horizon as seen by an observer.

With reference to FIG. 3(B), the light rays that stop at the bottom of FIG. 3 are generally indicated by reference number 24, the light rays that reach the bottom of the FIG. 3 but then bend upward to the top of the FIG. 3 are generally represented by reference number 26, and the light rays that bend downward but then rise upward are generally indicated by reference number 28. As further seen in FIG. 3(B) the light rays generally indicated by reference number 30 reach the bottom of the Figure, but then steeply bend upward and represent the light rays that represent the inferior mirage image. Each of the light rays 26, 28 and 30 have an elevation angle, sometimes referred to as a true elevation, relative to the observer with light ray 28 having a greater elevation angle than that of either ray 26 or ray 30. Further, each of the light rays 26, 28 and 30 has an angular separation between each other.

As further seen in FIG. 3(B) the light rays, such as ray 28, and the light rays 30 associated with the inferior mirage image, cross-over and intersect with each other at zone 32 which represents the mirage zone previously mentioned. An object that possesses or emits rays that cross-over at the mirage zone represent rays having two different elevation angles relative to an observer and are of particular importance to the present invention. More particularly, the cross-over rays that intersect forming the mirage zone 32 define the range of the target 12 and the height of the target 12. For the example generally illustrated in FIG. 3(B), the cross-over rays represent a range of a target 12 of about 12 km and a height of a target 12 of about 20 m.

The practice of the present invention constructs the ray tracing, which is important to the present invention, to define each of the real image and inferior mirage image of the target 12 and then further determines the intersection formed by the cross-over rays defining these real and inferior mirage images with the intersection point defining the height and range of the target being analyzed.

In general, if the atmosphere 14 is sub-refractive, the method of the present invention uses a ray tracing technique wherein two rays are launched through a model having profile of the sub-refractive atmosphere. The point of intersection of the two launched rays give the observer or the detection system 10 an estimate of the height and range of the target that produce the mirage. Alternatively, the practice of the present invention may be considered from the viewpoint of an observer determining the elevation angles of the real and imaginary images relative to the horizon. The development of the ray tracing techniques related to the present invention may be further described with reference to FIG. 4 which is composed of FIGS. 4(A) and 4(B) and makes reference to a plurality of terms having a general definition given in Table 1.

TABLE 1

| TERM | GENERAL DEFINITION |
| --- | --- |
| r | Size of Range Step |
| $R_1$ | Prior Range Value |
| $R_2$ | Next Range Value |
| $R_T$ | Range of Target |
| $H_\phi$ | Initial Height (Observer's Height) |
| $H_{P1}$ | Prior Height of the Primary Ray |
| $H_{P2}$ | Next Height of the Primary Ray |
| $H_{M1}$ | Prior Height of the Mirage Ray |
| $H_{M2}$ | Next Height of the Mirage Ray |
| $H_T$ | Height of the Target |
| $\Theta_{P\phi}$ | Initial Elevation of the Primary Ray. (The Observer's apparent elevation of the primary image) |
| $\Theta_{P1}$ | Prior Elevation Angle of the Primary Ray |
| $\Theta_{P2}$ | Next Elevation Angle of the Primary Ray |
| $\Theta_{M\phi}$ | Initial Elevation of the Mirage Ray. (The Observer's apparent elevation of the mirage image). |
| $\Theta_{M1}$ | Prior Elevation Angle of the Mirage Ray. |

TABLE 1-continued

| TERM | GENERAL DEFINITION |
|---|---|
| $\Theta_{M2}$ | Next Elevation Anqle of the Miraqe Ray. |
| $n_{P1}$ | Index of Refraction at $H_{P1}$ |
| $n_{P2}$ | Index of Refraction at $H_{P2}$ |
| $n_{M1}$ | Index of Refraction at $H_{M1}$ |
| $n_{M2}$ | Index of Refraction at $H_{M2}$ |

Figure 4A:
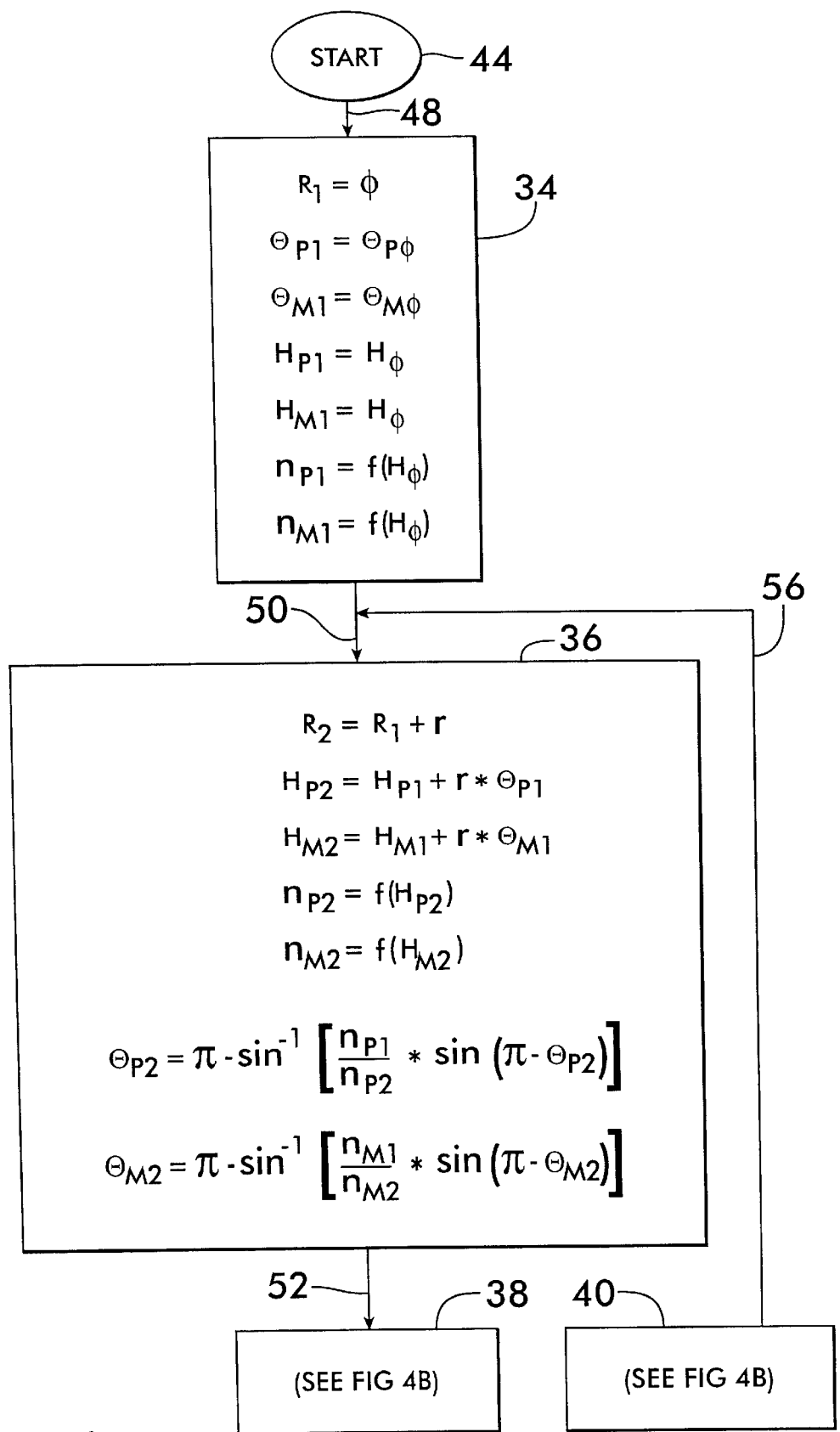
FIG. 4 is composed of FIGS. 4(A) and 4(B) and comprises a flow diagram illustrating the informational flow related to the ray tracing program that is of particular importance to the practice of the present invention.
Figure 4B:
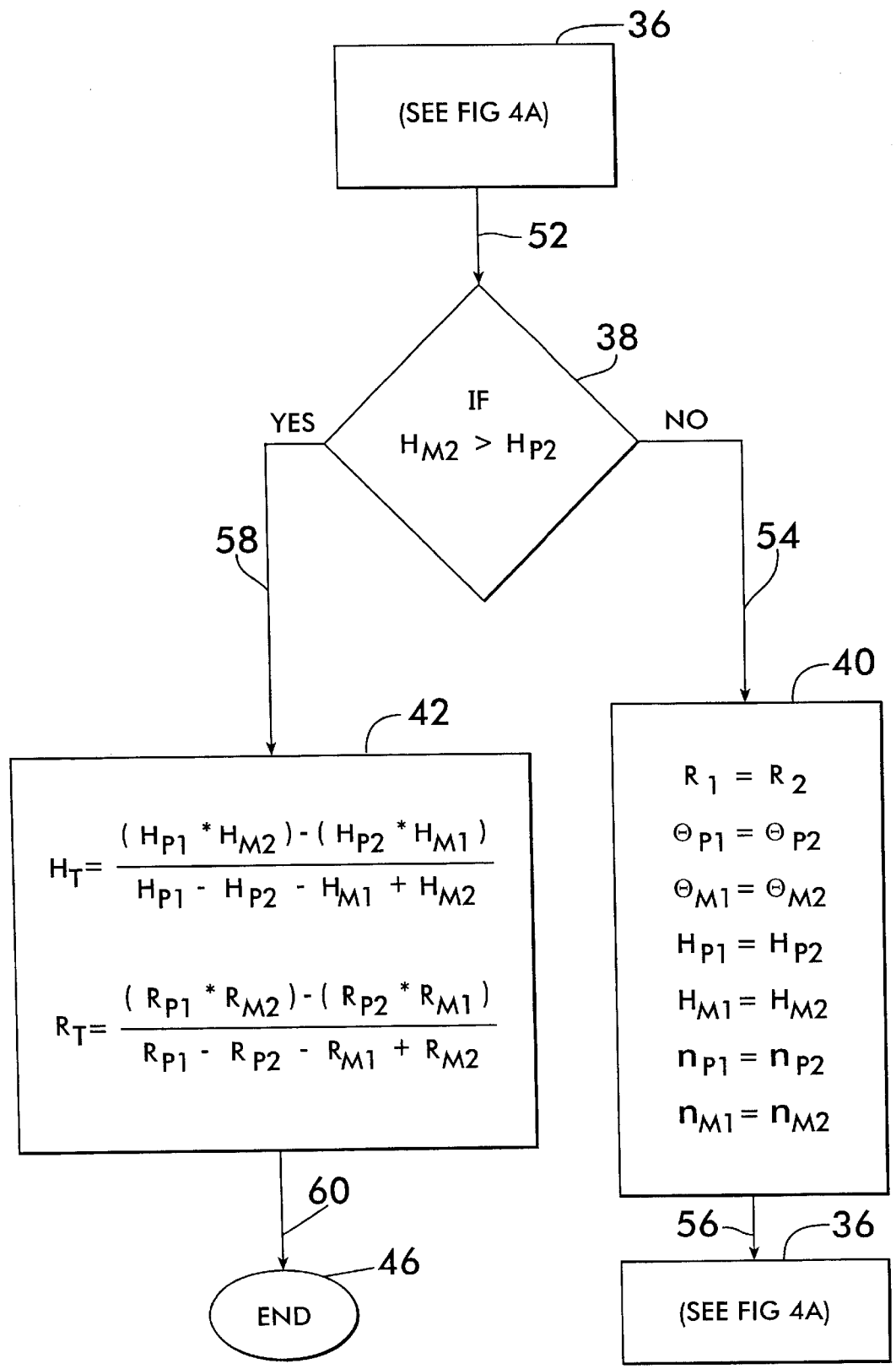

The ray tracing program of FIG. 4 is comprised of program segments 34, 36, 38, 40 and 42, along with start event 44 (FIG. 4(A)) and end event 46 (FIG. 4(B)). The start event 44 is directed to program segment 34 by way of signal path 48.

Program segment 34 is a first or initialization step in which all of the functions therein are initialized, and when such initialization is complete, program segment 34 passes control to program segment 36 by way of signal path 50.

Program segment 36 is the first step in the ray tracing program and wherein all the functions therein are determined in a manner also shown therein. After all the functions of program segment 36 is determined, control is passed to program segment 38 of FIG. 4(B) by way of signal path 52.

Program segment 38 checks to determine if the height of the mirage ray is higher than that of the primary ray. If the answer to the determination of program segment 38 is no, control is passed to program segment 40 by way of signal path 54.

Program segment 40 prepares for the next step by increasing the quantities of segment 34 to those shown in segment 40. After such increase, program segment 40 passes control to program segment 36 of FIG. 4(A) by way of signal path 56 for the continuation of the ray tracing program.

If the answer to the determination of program segment 38 of FIG. 4(B) is yes, control of program segment 38 is passed to program segment 42 by way of signal path 58.

Program segment 42 calculates the range and height of the target, using the equations shown therein, by determining the intersection of the rays of the real and inferior mirage images. After program segment 46 completes its calculation it passes control to the end event 46 by way of signal path 60.

SENSITIVITY ANALYSIS

In the practice of the present invention the sensitivity of the ranging technique embodied, in part, in FIG. 4 was performed to determine the inaccuracies involved with various observer measurements, that is, measurements that may be performed by the detector system 10. The sensitivity analysis perform ray tracing from the source, that is from the target 12, through the sub-refractive atmosphere 14 to the detection system 10 and then to the intersection point of the real image and the inferior mirage images of the target 12. This path tracing was repeated and the sensitivity of the technique for each parameter involved in the analysis was quantified with the meteorological parameters of atmosphere given in Table 2 being taken into account and having three different ASTD values; –0.5° C., –2.0° C., and –4.0° C., also given in Table 1.

TABLE 2

| | ASTD VALUES IN C° | | |
|---|---|---|---|
| | –0.5 | –2.0 | –4.0 |
| Sea Temp. [° C.] | 20 | 20 | 20 |
| Air Temp. [° C.] | 19.5 | 18 | 16 |
| Relative Humidity [%] | 80 | 80 | 80 |
| Pressure [mbar] | 1013.25 | 1013.25 | 1013.25 |
| Temp/Relative Humidity/ Pressure (T/RH/P) Meas. Height [m] | 12 | 12 | 12 |
| Wind Speed [m/s] | 5 | 5 | 5 |
| Wind Meas. Height [m] | 19.5 | 19.5 | 19.5 |
| Wave Height [m] | 1 | 1 | 1 |
| Observer Height [m] | 15 | 15 | 15 |

The sensitivity analysis was performed using a sensor, such as an infrared camera, with an angular resolution of 32.8 $\mu$ radians and the results thereof are shown in FIG. 5 having an X axis indicating the range of the target 12, given in km, and a Y axis indicating the height of the target 12, given in meters, with the target 12 being enveloped in a sub-refractive atmosphere 14.

Figure 5A:
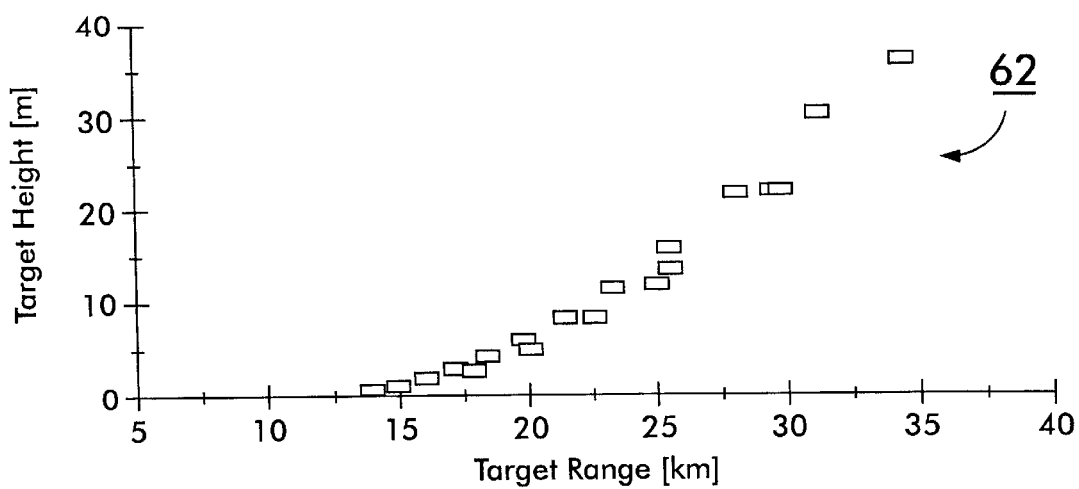
FIG. 5 is composed of FIGS. 5(A), 5(B), and 5(C), that illustrates the determination of the height and range of a target by the present invention for three representative meteorological conditions.
Figure 5B:
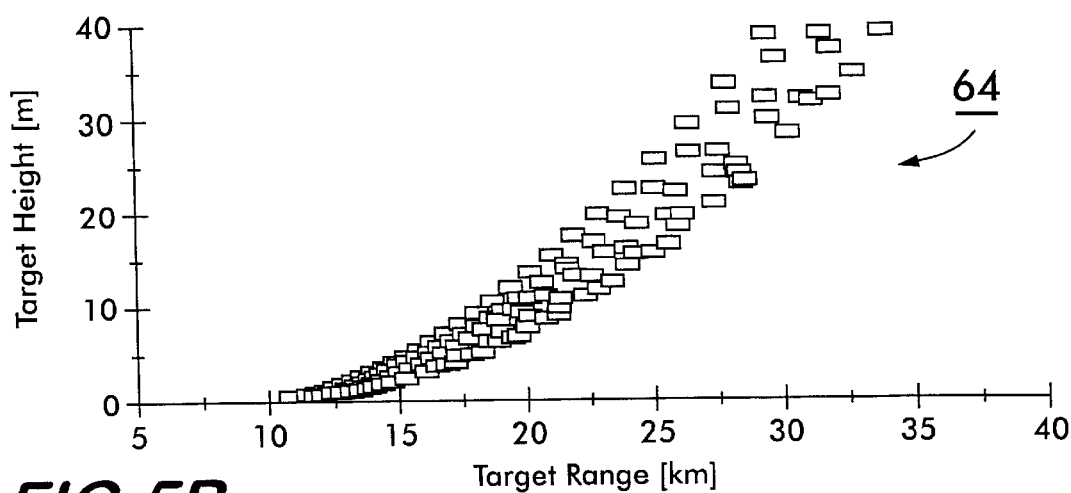
Figure 5C:
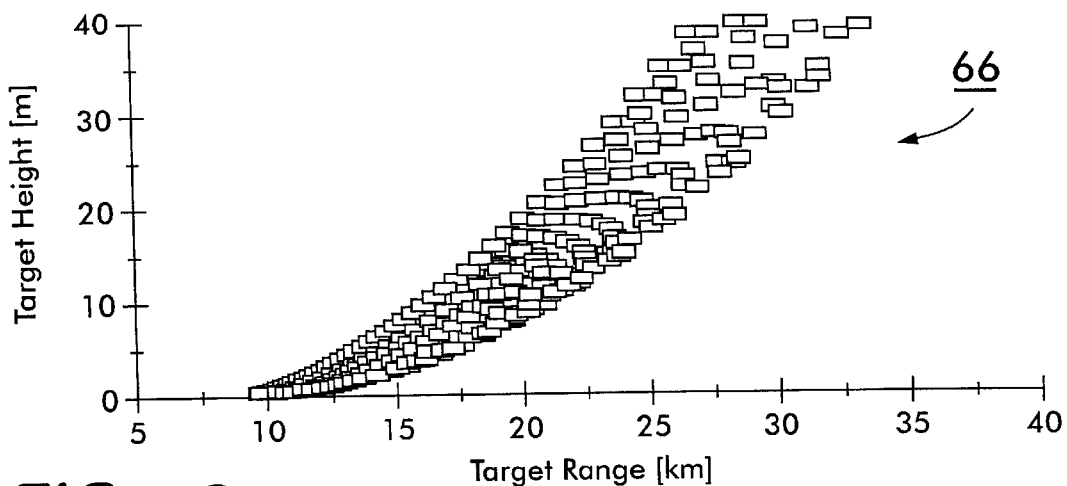

FIG. 5 is composed of FIGS. 5(A), 5(B) and 5(C) respectively representing three sub-refractive atmospheres 14 having the ASTD values of Table 1, that is –0.5° C., –2.0° C. and –4.0° C. FIGS. 5(A), 5(B) and 5(C) respectively depict plots 62, 64 and 66 each representative of a mirage zone.

As seen in FIG. 5, as the ASTD becomes more negative (Fig. it 5(C)), the trend is for the mirage zone, such as represented by plot 38, to become larger and closer to the observer (range decreases). As further seen in FIG. 5, as the ASTD becomes less negative (FIG. 5(A)), the mirage zone 62 gets smaller and further from the observer (range increases). The results indicated in FIG. 5 become inaccurate when the ASTD is zero or above because the mirage zone of particular importance to the present invention no longer exists for these positive values ASTDs.

The measurement errors are taken into consideration to calculate the induced error in range prediction. Since the range and height prediction are simultaneously determined by the intersection of the two rays (one ray representing the real image of the target 12 and the other representing the inferior mirage image of the target 12), in a manner as previously described, an error in the range is reflected by a similar error in height. However, the sensitivity analysis concentrated on the induced range error, furthermore, the sensitivity analysis also took into account the ASTD error by simulating varying sea temperatures while holding the air temperatures constant, and the results thereof may be further described with reference to FIG. 6.

Figure 6A:
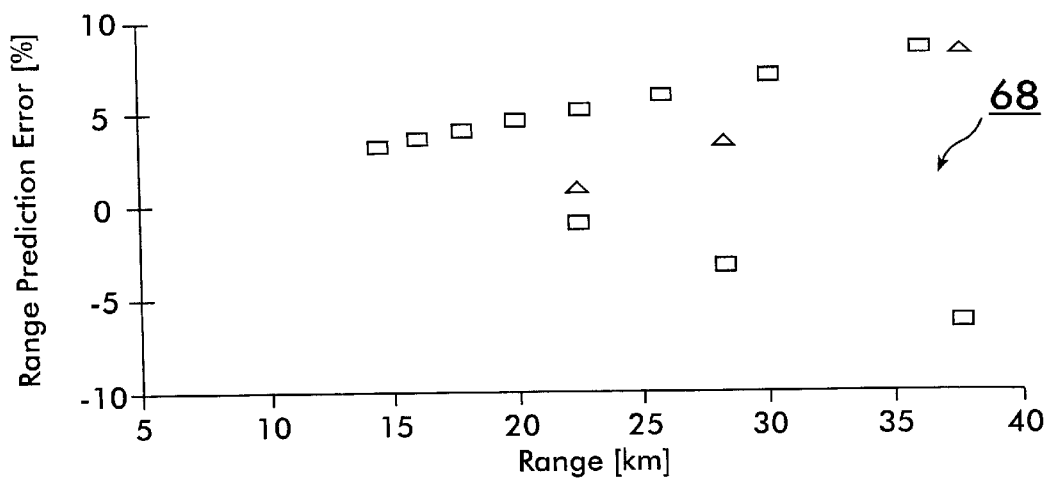
FIG. 6 is composed of FIGS. 6(A), 6(B), and 6(C) that show the range prediction errors caused by three different air-sea temperature differences (ASTD) errors.
Figure 6B:
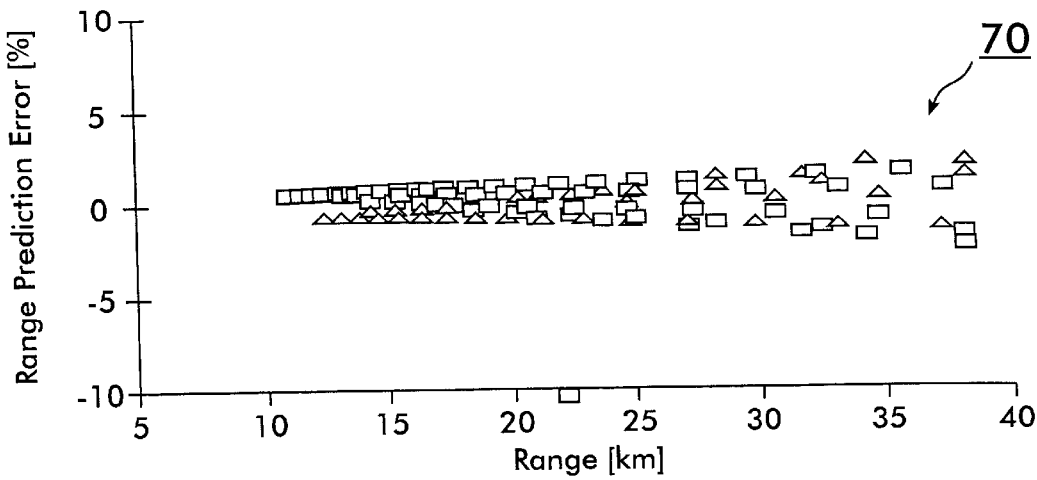
Figure 6C:
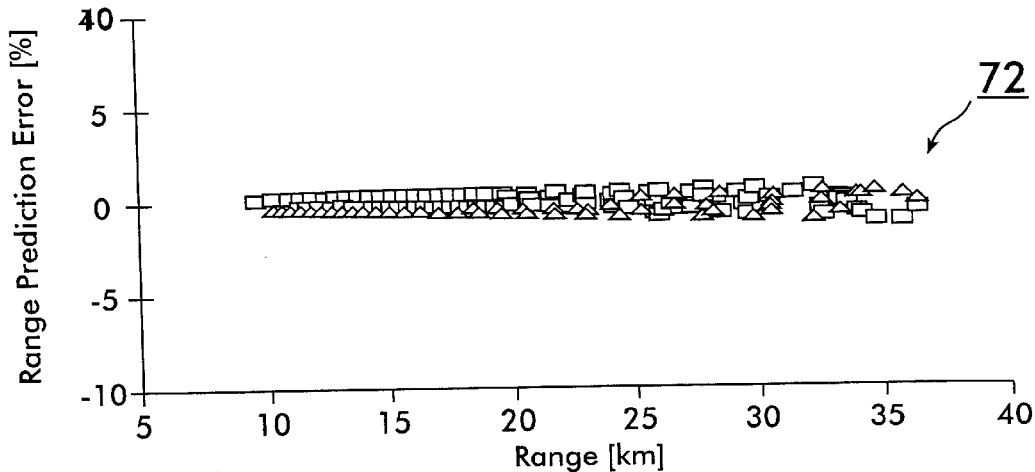

FIG. 6 has an X axis giving the range, in kilometers, of the target 12 and a Y axis giving the range prediction error related to that same target 12, the target being enveloped in a sub-refractive atmosphere 14. FIG. 6 is composed of FIGS. 6(A), 6(B), and 6(C) respectively illustrating the induced range errors for the sub-refractive atmospheres 14 having a –0.50° C., –2.0° C. and –4.0° C., with each ASTD having an error of +/–0.1° C. FIGS. 6(A), 6(B) and 6(C) respectively depict plots 68, 70 and 72.

With reference to FIG. 6, it is seen that as the ASTD becomes more negative, that is, FIG. 6(C), the ranging techniques become less sensitive to the ASTD error or other parameters. However, as ASTD error becomes less negative and approaches zero, the ranging techniques of the present invention increase in their sensitivity to ASTD errors, and to errors in other parameters.

MEASURED DATA

In the practice of the present invention testing was performed using infrared cameras with a resolution of 32.8×

32.8 µ radians and serving as sensor 18 of FIG. 1. Two infrared sources were used for two different targets 12 of the present invention. The first source or target was a land-based tower located 18.5354 km down river from the infrared sensor 18 located at the input stage of the detection system 10 and the second source or target was a tower mounted near the stern of a 60 foot boat. Both infrared sources were moved in a preprogrammed motion, cycling up and down the towers thereof, and detection means with the infrared cameras were operated at a data gathering rate of 4 Hz. Furthermore, two buoys each providing meteorological data were moored in the center of the optical paths between the infrared camera 18 and the two targets 12. The results of the testing are given in FIGS. 7 and 8, with both Figs. having an X axis giving the range of the target in kilometers and a Y axis giving the elevation, in µ radians, of the target.

Figure 7:
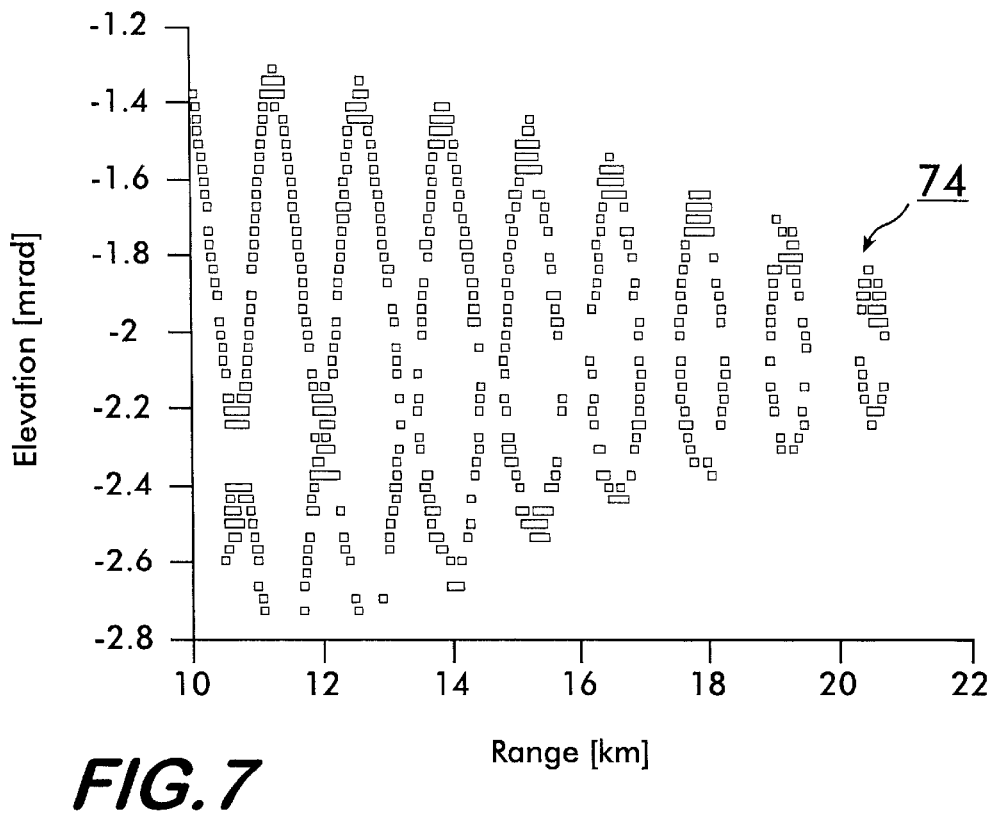
FIG. 7 shows the apparent elevation versus range function of a single target detected by the present invention in a sub-refractive atmosphere.

FIG. 7 shows the apparent elevation versus range function from the boat acting as the first target 12 in a sub-refractive atmosphere 14 and depicted by a plot 74. From FIG. 7 it is seen that there are several loops in the plot 46 thereof, with the upper portions being due to the motion of the real image of the boat serving as the first target 12 and acting as the first source of light rays, and further with the lower portions being due to the motion of the inferior mirage images of the first target 12 moving in a sub-refractive atmosphere 14. From FIG. 7 it is seen that the loops become smaller with increasing ranges since less of the tower on the boat is seen by the detection system 10 and thus less of the motion of the tower on the boat is seen by the detection system 10.

Figure 8:
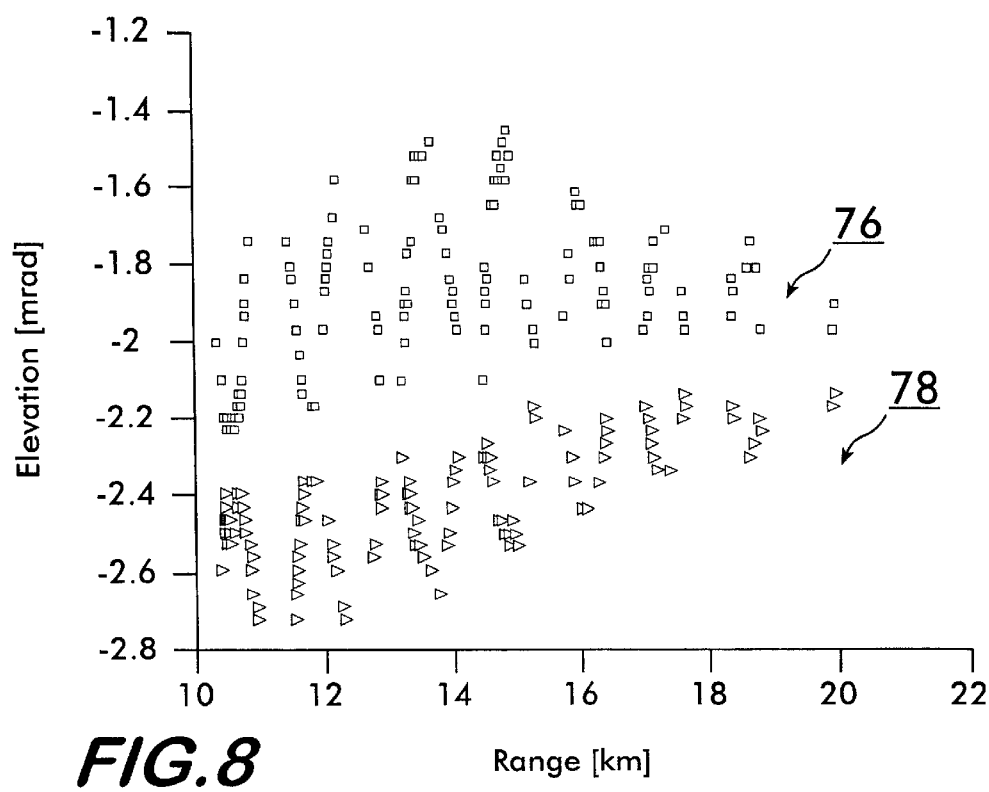
FIG. 8 shows the apparent elevation versus range function of the simultaneous detections by the practice of the present invention of the primary and mirage images of a single target.

FIG. 8 shows two plots 76 and 78 that are respectively representative of simultaneous two image detections during the same testing phase of the first and second targets 12. The bottom of the lower loops of plot 78 are truncated by the horizon, that is the X axis and, so as to identify the elevation angle of the horizon.

Although the previously given description described angles in terms of absolute elevations; i.e., measured relative to the observer's horizontal plane, it should be recognized that if the observer can determine the horizon, the elevation angles of the two images relative to the horizon can be used instead of absolute elevation. The horizon is usually readily apparent in the infrared from the temperature difference between the air and the water in sub-refractive atmosphere. This alternative approach may be further described with reference to FIG. 9 which is also applicable to the hereinbefore given description.

Figure 9:
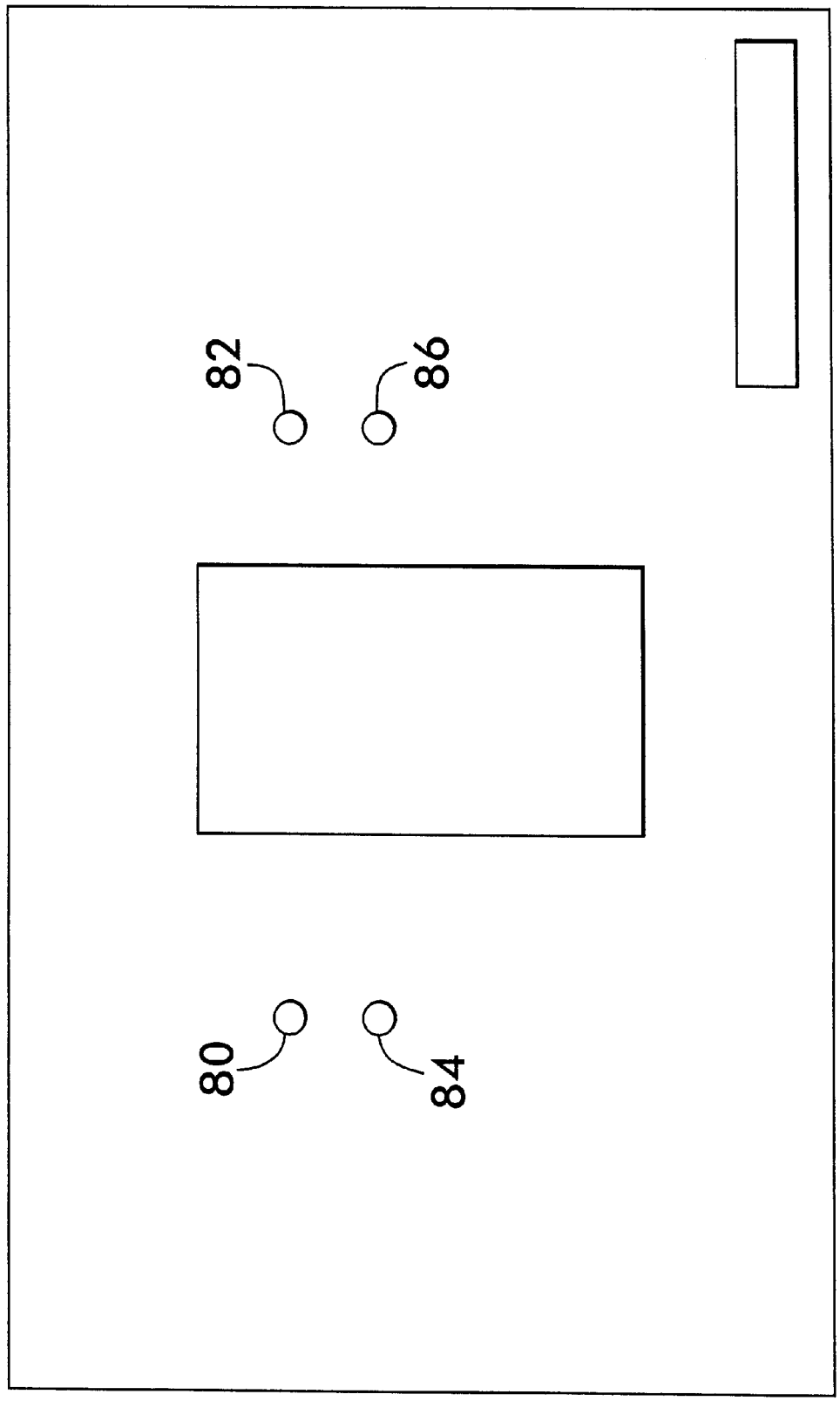
FIG. 9 illustrates a typical imagery of two targets and their associated mirages in a sub-refractive atmosphere.

FIG. 9 illustrates imagery of two targets 80 and 82 and their associated mirages 84 and 86 respectively in a sub-refractive atmosphere. The target 80 is about 3 m high and 17 km away from the sensor 18 of FIG. 1 and the target 82 is about 26 m high and 30 km away from sensor 18 of FIG. 1.

The alternative approach needs to have the operating routines, being run in the processor 20, knowledge of the angular resolution of the sensor 18, and either (1) the elevation the sensor 18 is pointing or (2) be able to discern the horizon through the sensor 18. The first allows the calculation of the absolute elevation of the images; the second allows the calculation of the elevation of the images relative to the horizon.

It should now be appreciated that the practice of the present invention provides for a method, and a system responsible thereto, that relies upon the presence of a sub-refractive atmosphere which allows for the formation of both real and inferior mirage images of a target being analyzed by the detection system 10 of the present invention. The present invention performs essential ray tracing techniques to detect the cross-over or intersection points of these images which, in turn, represent the height and range of the target being analyzed.

It is understood that the invention is not limited to the specific embodiments herein illustrated and described but may be otherwise without departing from the spirit and scope of the invention.

What I claim is:

1. A method for determining the height and range of a target acting as a source of electromagnetic radiation and enveloped by a sub-refractive atmosphere that causes the presence of both a real image and an inferior mirage image of said target, said method comprising the steps of:

(a) providing a sensor for receiving the electromagnetic radiation of said target and producing said real image and inferior mirage image of said target;

(b) determining the elevation of said real and inferior mirage images;

(c) determining the angular separation between said real and inferior mirage images;

(d) constructing ray tracing to define each of said real and inferior mirage images; and (e) determining the intersection point of the rays defining said real and inferior mirage images with said intersection point defining said height and range of said target.

2. The method according to claim 1, wherein said sensor is selected from one of visible band and infrared sensors.

3. The method according to claim 2, wherein said infrared sensor is an are infrared camera.

4. The method according to claim 3, wherein said infrared camera has a resolution of about 32.8×32.8µ radians.

5. The method according to claim 3, wherein said infrared camera is responsive to a detection routine having a data gathering rate of about 4 Hz.

6. A system for determining the height and range of a target acting as a source of electromagnetic radiation and enveloped by a sub-refractive atmosphere that causes the presence of both a real image and an inferior mirage image of said target, said system comprising:

(a) at least one sensor for receiving the electromagnetic radiation of said target and producing said real and inferior mirage images of said target;

(b) means for determining the elevation of said real and inferior mirage images;

(c) means for determining the angular separation between said real and inferior mirage images;

(d) means for constructing ray tracing to define each of said real and inferior mirage images; and (e) means for determining the intersection point of the rays defining said real and inferior mirage images with said intersection point defining said height and range of said target.

7. The system according to claim 6, wherein said sensor is selected from one of visible band and infrared sensors.

8. The system according to claim 7, wherein said infrared sensor is an infrared camera.

9. The system according to claim 8, wherein said infrared camera has a resolution of about 32.8×32.8µ radians.

10. The system according to claim 6, wherein said infrared camera is responsive to a routine having a data gathering rate of about 4 Hz.

11. The system according to claim 6, wherein said means for determining the elevation and angular separation of said real and inferior mirage images, said means for constructing ray tracing and said means for determining the intersection point comprises programmable means responsive to appropriate operating routines.

\* \* \* \* \*